United States Patent [19]

Griscom et al.

[11] 4,455,601
[45] Jun. 19, 1984

[54] CROSS CHECKING AMONG SERVICE PROCESSORS IN A MULTIPROCESSOR SYSTEM

[75] Inventors: Robert E. Griscom; Thomas A. Stranko, both of Poughkeepsie, N.Y.

[73] Assignee: International Business Machines Corporation, Armonk, N.Y.

[21] Appl. No.: 336,123

[22] Filed: Dec. 31, 1981

[51] Int. Cl.³ .................... G06F 15/16; G06F 11/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,882,455 | 5/1975 | Heck et al. | 364/200 |
| 3,905,023 | 9/1975 | Perpiglia | 364/200 |
| 4,204,249 | 5/1980 | Dye et al. | 364/200 |
| 4,212,059 | 7/1980 | Sato et al. | 364/200 |

*Primary Examiner*—Gareth D. Shaw
*Assistant Examiner*—Daniel K. Dorsey
*Attorney, Agent, or Firm*—James E. Murray

[57] ABSTRACT

In a multiprocessor system which includes a plurality of service processors, only one of the service processors is actively in control of the system, while the other is a backup. Upon the occurrence of a malfunction in the active service processor, the standby service processor can be switched in to assume control of the system. The service processor which had been active then becomes the backup system.

8 Claims, 6 Drawing Figures

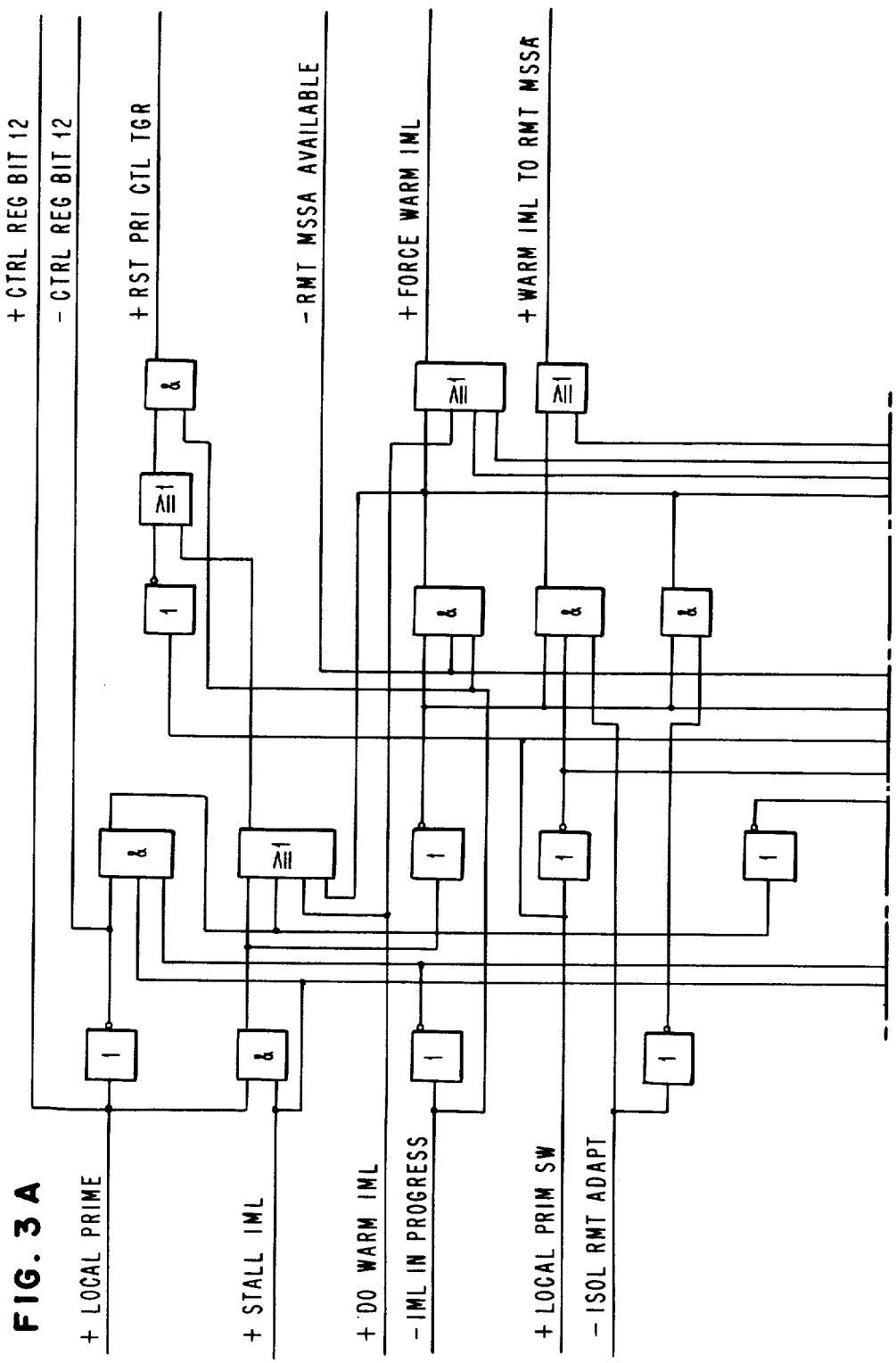

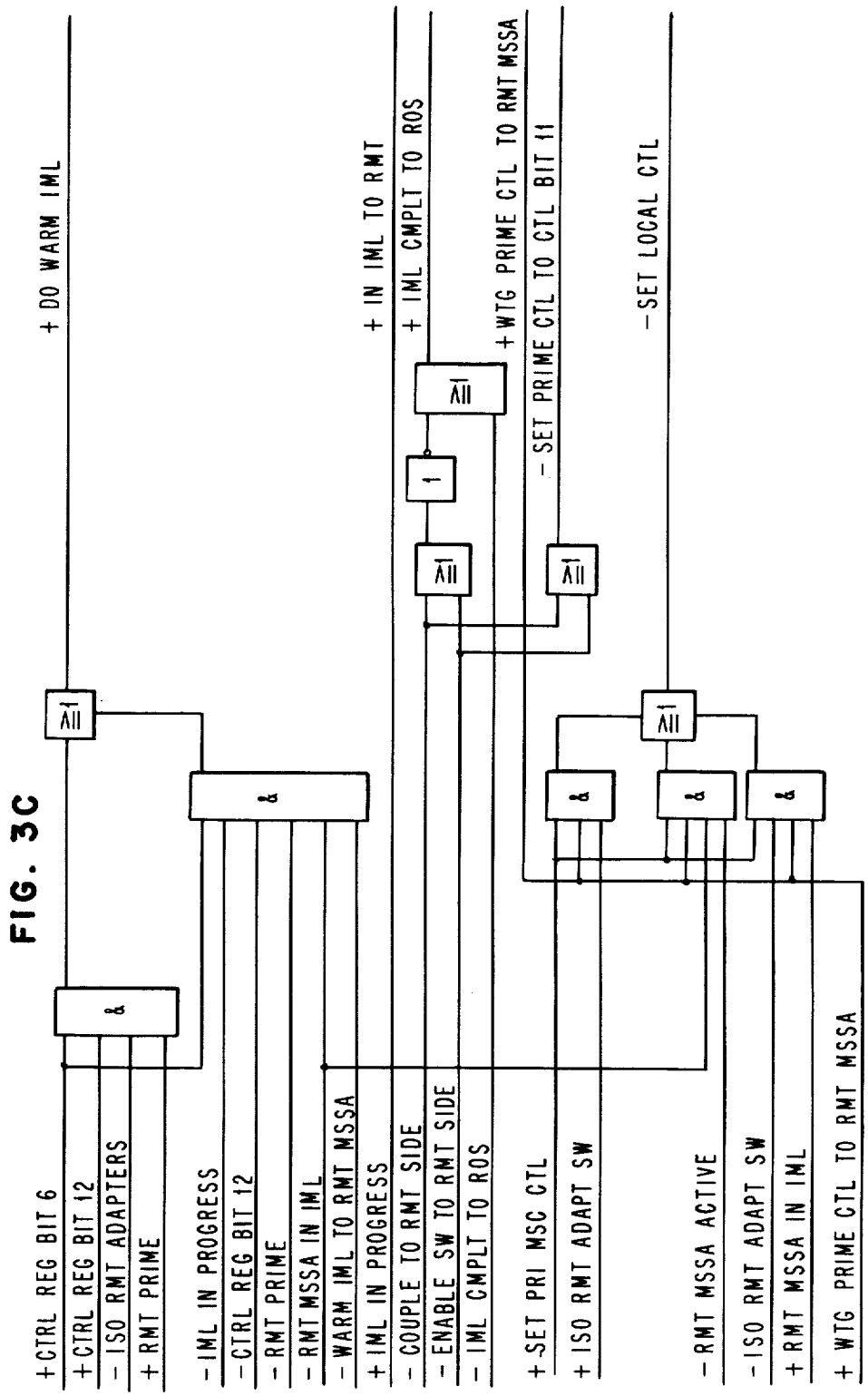

CROSS CHECKING AMONG SERVICE PROCESSORS IN A MULTIPROCESSOR SYSTEM

BACKGROUND OF THE INVENTION

1. Field of the Invention

This invention relates to multiprocessor systems which include a plurality of service processors for monitoring and controlling various system parameters. More particularly, the invention relates to the interrelationship between the plurality of service processors and mechanisms for ensuring that one properly functioning service processor is in control of the system at all times.

2. Prior Art

A multiprocessor system can be assembled by coupling a plurality of uniprocessor systems together. Even though each of the uniprocessor systems may have its own service processor for performing various monitoring and control functions, it is desirable that the entire multiprocessor system be under the control of only one service processor.

Although this could be accomplished by providing only a single service processor in the multiprocessor system, reliability would be enhanced by having two service processors available to the system. It also allows the reconfiguration to two basic, totally independent processors.

SUMMARY OF THE INVENTION

In accordance with a preferred embodiment of the invention, a multiprocessor system is provided in which each of the processors have a service processor associated with it. After initialization, only one of the service processors is actively in control of the system, while the remaining service processor is dormant. Various aspects of the active service processor are continually monitored by an associated support adapter which, upon detection of one of a predetermined set of conditions, can cause the dormant service processor to assume control of the system, while the previously active service processor becomes dormant. In accordance with the preferred embodiment, each time that one of the predetermined conditions arises in an active service processor, the other service processor will assume control of the system, even if that one had previously lost control because it manifested one of the predetermined conditions. Additionally, the support adapter associated with the dormant service processor performs certain other monitoring functions and, with respect to a more limited set of predetermined situations, it can initiate a swapping of roles between the active and dormant service processors.

Various advantages result from utilization of this invention. Total system reliability is substantially enhanced by the availability of a backup service processor (without the monitoring functions performed by a service processor, the system could not run.)

The monitoring of the active service processor, and the swapping of roles between the active and dormant service processor, when necessary, are transparent to the system user. Thus, the user preceives no adverse impact from utilization of this invention.

BRIEF DESCRIPTION OF THE DRAWINGS

FIGS. 3A–3D show further details of the apparatus for selecting which service processor will control the system, and for monitoring the active service processor.

DETAILED DESCRIPTION

The multiprocessor system which forms a preferred embodiment of this invention is comprised of two uniprocessor systems coupled together. Descriptions of various aspects of an appropriate uniprocessor system which may be used in implementing this invention are found in the following manuals, all available from International Business Machines Corporation. The manuals are part of the IBM Maintenance Library, 3081 Processor Complex. Individual titles are:

Processor Unit Introduction/Maintenance (PRM) (Form No. Sy227061);
Central Storage and External Data Controller Introduction/Maintenance (CSM) (EDC) (Form No. SY22-7062);
3082 Processor Controller Maintenance (PCM) (Form No. SY227063);
3082 Processor Controller Theory/Diagrams (PCT) (Form No. SY22-7064);
3082 Processor Controller User's Guide (UGD) (Form No. SY22-7065);
Power Operation and Maintenance (PWR) (Form No. SY22-7066);
3087 Coolant Distribution Unit Coolant Distribution and Maintenance (CDU) (Form No. SY22-7067);
3089 Power Unit Installation/Maintenance (PGM) (Serial Numbers Below 41000) (Form No. SY22-7069);
Return Codes and Messages (RCM) (Form No. SY22-7070);
Maintenance Guide (Form No. SY22-7071);
3089 Power Unit Installation/Maintenance (PGM) (Serial Numbers 4100 and Above) (Form No. SY22-7072).

Additional valuable reference material may be found in patent application Ser. No. 319,870 filed Nov. 10, 1981 for Rapid Instruction Redirection and in patent application Ser. No. 320,162 filed Nov. 10, 1981 for Machine Check Coordination, both of said applications being assigned to International Business Machines Corporation. These applications are of interest because they furnish additional information regarding the support adapter in which the primary portions of this invention are implemented.

The contents of all of the above manuals and the above patent applications are incorporated into this specification by this reference.

Figure 1:
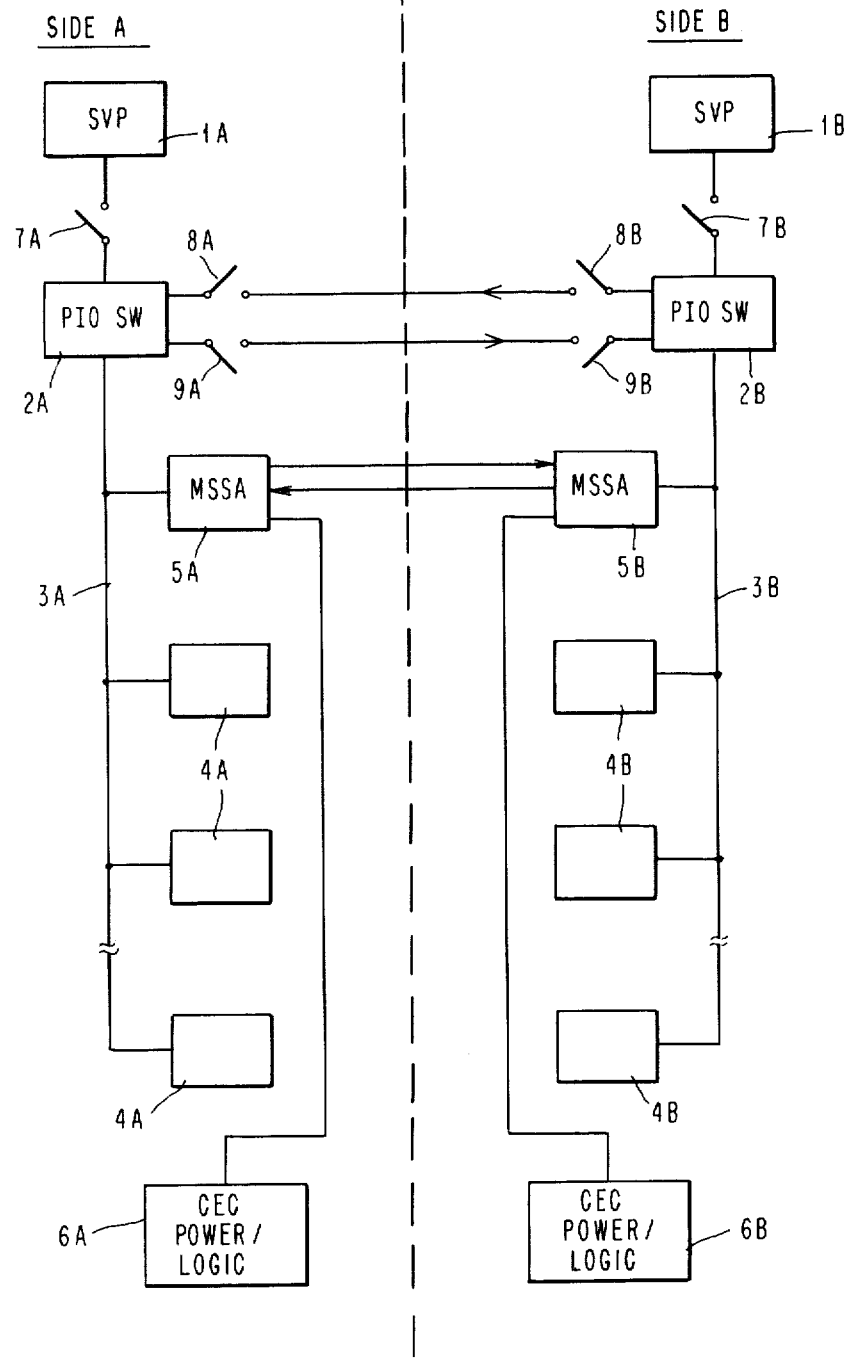
FIG. 1 is a block diagram of a multiprocessor system embodying the invention.

FIG. 1 shows a simplified block diagram of a multiprocessor system. The system comprises two substantially indentical uniprocessor systems designated side A and side B in the drawing.

The system contains two service processors (SVP) 1A and 1B each connected to a programmable input/output (PIO) switch 2A and 2B. The primary purpose of the PIO switch is to provide a redrive capability for a PIO bus 3A and 3B which is the main interface to the system from the service processor. Connected to the PIO bus are a plurality of adapters 4A and 4B required to support devices such as files and displays which are needed to give the service system its control capability. The most important adapter connected to the PIO bus is a maintenance service and support adapter (MSSA) 5A and 5B which provides the interface between the service processor and the system's central electronic complex (CEC) 6A and 6B. The CEC contains the power and logic for the central data processing system. In addition to providing an interface between the service processor and the CEC, the MSSAs contain logic for performing a variety of functions including the monitoring and reconfiguring functions that are an integral part of the instant invention.

In the multiprocessor system, there are basically two linkages between the two independent service systems. The most critical linkage is between the two PIO switches 2A and 2B. This is the linkage through which the service processor which is in control of the system is able to communicate with the adapters, including the MSSA, on the other side of the system. This link is essential to communication between the service processor on one side (A or B) and the central electronic complex on the other side (B or A). Without the link between the PIO switches, the active service processor would be unable to communicate with the CEC on the other side. The system could then not function in a multiprocessor mode. The second link between the two sides of the multiprocessor system is between the MSSAs 5A and 5B. Although this link is not as critical as the one between the PIO switches, it does permit certain valuable monitoring and control functions which will be discussed below.

Because of the criticality of the link between them, the PIO switches are connected by two bidirectional buses. In the preferred embodiment of the invention, one of the buses is used when the side A service processor is active, the other bus is used when the side B service processor is active. If one of the buses fails, only the service processor associated with the good bus can control the MP system. The MSSA to MSSA connections are not nearly so critical. They are utilized only in a small number of checking situations. Also, even if the MSSA to MSSA connections were to be severed, the controlling service processor could still communicate with the MSSA on the other side through the PIO switches.

The communication between the MSSAs is of significance primarily during the initial microprogram load (IML) of the system. After IML is complete, one of the service processors should be in control of the system and the other should be dormant. These situations are signaled by status indicators from one MSSA to the other. At the end of IML, if both service processors appear to be in active control, or if neither service processor has taken active control, an error has occurred. In either of these situations, each of the MSSAs will generate a signal to cause reinitialization of the IML procedure.

After a successful IML, one service processor will be in control of the system, and it will be monitored by the MSSA that is on the same side of the system. If the MSSA detects a problem (such as a stall) with its active service processor, it will signal through the other MSSA to the other service processor to start up and to take over the system. The originally controlling service processor will then become the dormant one.

Even after IML, the MSSA associated with the dormant service processor monitors the MSSA that is associated with the active service processor. This monitoring simply comprises checking two lines: one indicating that the other MSSA is associated with the active service processor; the other indicating that the other MSSA is itself active. If either of these lines drops, it will be assumed that a power failure occurred at the side of the active service processor, and the other MSSA will cause its associated service processor to take over the system while, at essentially the same time, switching out the previously active service processor. The service processors are switched into and out of control of the system through programmable switches 7A and 7B which interconnect the respective service processors to the PIO switches on the same side of the system. Connection between the PIO switches is through programmable switches 8A and 8B and 9A and 9B. These switches enable utilization of either of the bidirectional buses which can interconnect the PIO switches.

Figure 2:
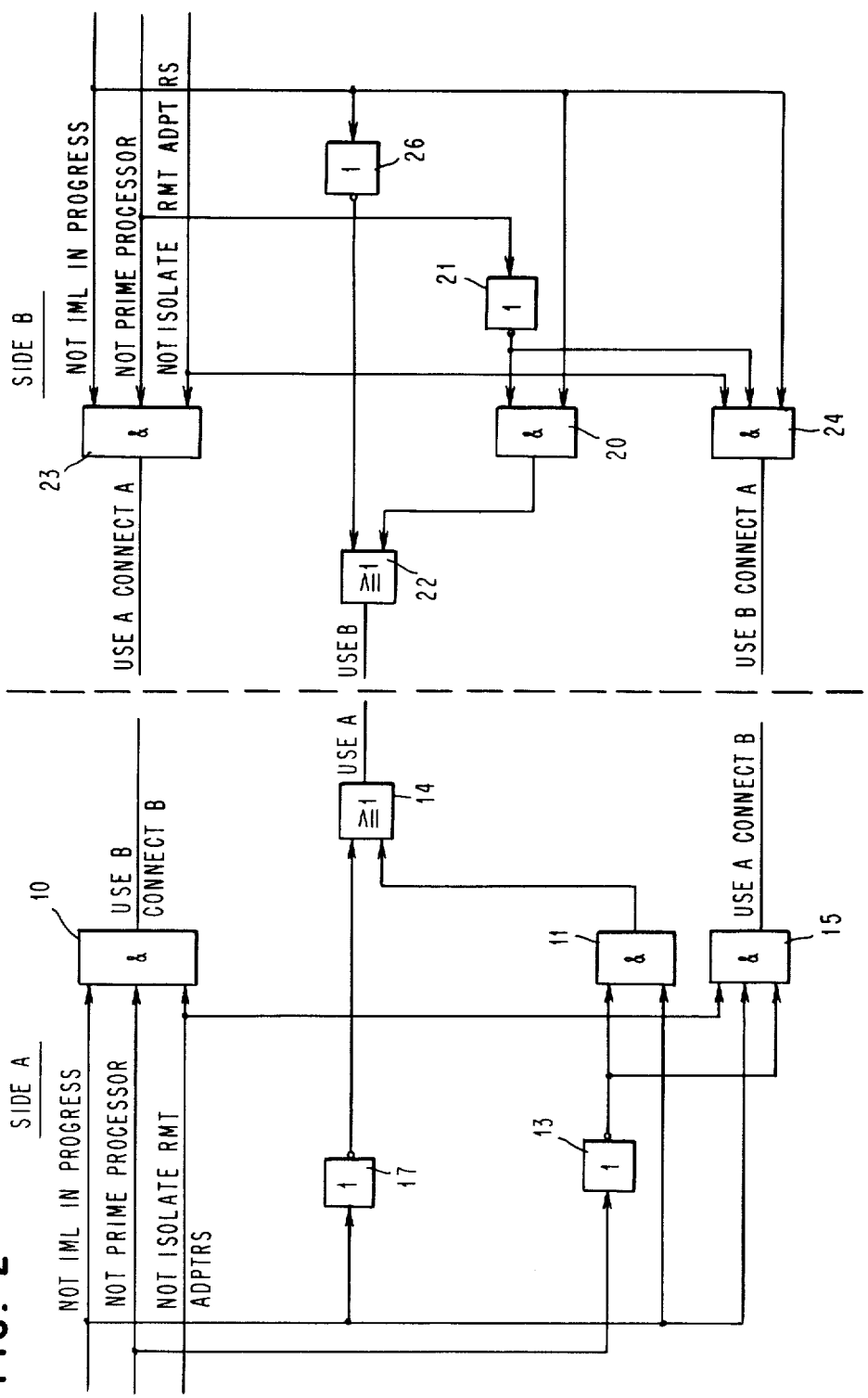
FIG. 2 shows some details of the apparatus which determines which service processor will control the system.
Figure 3B:
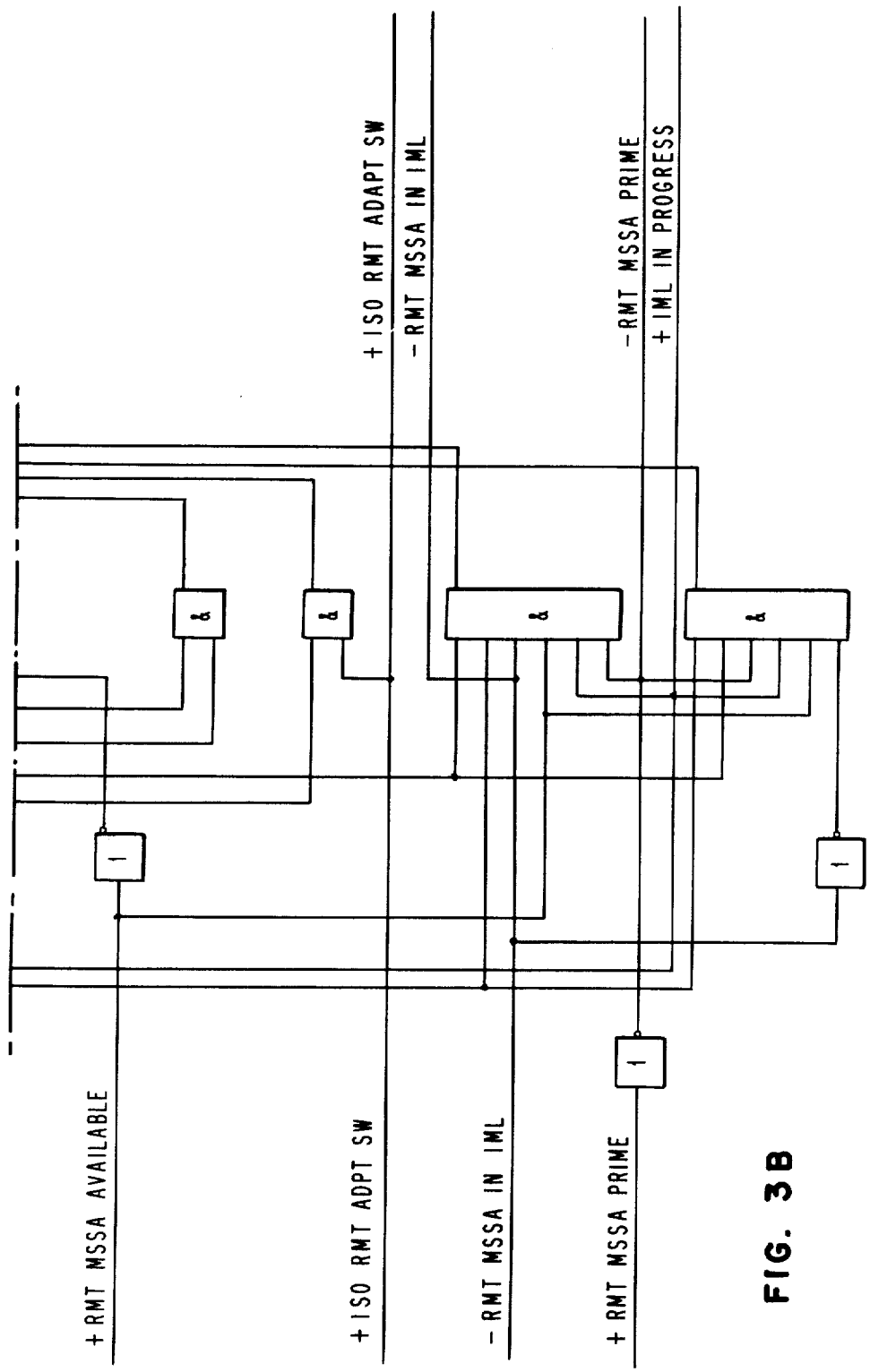
Figure 3D:
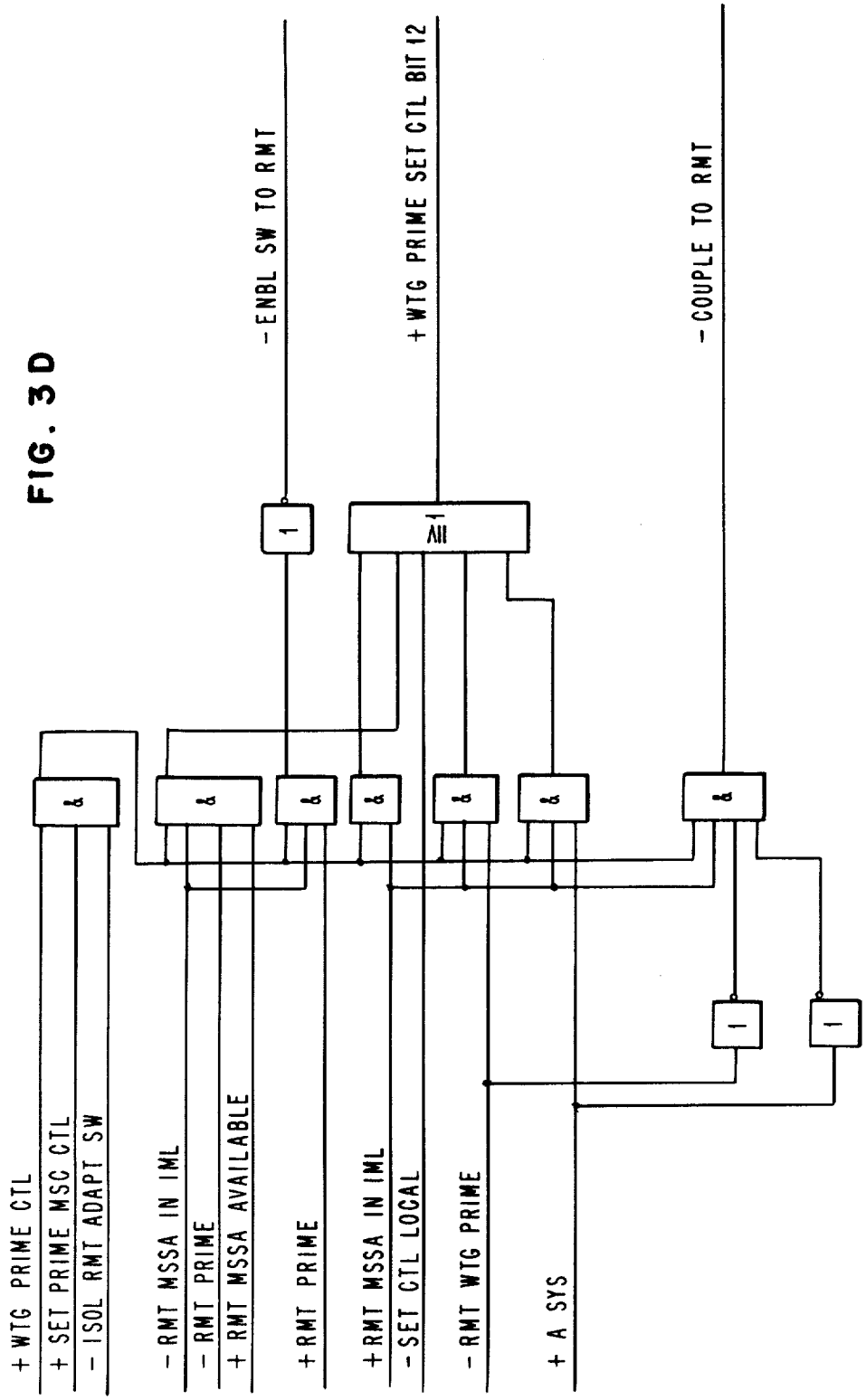

FIG. 2 presents a logic diagram of the portion of the logic which controls switches 7A and 7B, 8A and 8B and 9A and 9B that are shown in FIG. 1. As shown in FIG. 2, the logic on the B side is essentially a mirror image of the logic on the A side.

The three input lines to the logic shown in FIG. 2 have the following significance in both MSSAs. NOT IML IN PROCESS indicates that IML has been completed. NOT PRIME PROCESSOR indicates that the service processor associated with this MSSA has not been selected to be the active service processor. After IML has been completed, the NOT PRIME PROCESSOR line should be up in one MSSA only if the service processor associated with the other MSSA has been selected as the active service processor. That is, after IML, the NOT PRIME PROCESSOR line should be up in one MSSA and not up in the other MSSA. NOT ISOLATE RMT ADPTRS indicates that a manual switch has not been set to isolate the adapters on the other side of the MP system.

After IML has been completed, if side A does not contain the primary service processor and if the remote adapters have not been set isolated, AND 10 will be enabled producing the signal to use service processor B and to connect its PIO switch to the B side. This signal will be used to control the closing of switch 8A in FIG. 1. This situation should only arise if the service processor on the B side has completed its IML and is the prime processor. In that case, AND circuit 20 on the B side will have been enabled through inverter 21, resulting in a signal through OR circuit 22 also producing a signal that the B side service processor should be used (in which case switches 7B and 8B would be closed).

After IML is complete, if the A side service processor is to be prime, inverter 13 will cause AND 11 to be enabled resulting in a signal through OR 14 to close switch 7A and use the A side service processor. AND 15 will also be enabled, producing a signal to close switch 9A. In this case, AND circuit 23 on the B side will be producing a signal to use the A side service processor and connect its PIO switch to the B side by closing switch 9B.

While the system is being initialized as two uniprocessors, the remote adapters are isolated. While this IML is still in process, inverters 17 and 26, respectively will produce signals through respective ORs 14 and 22 which are used to close switches 7A and 7B of FIG. 1 so that both service processors will be used in the two separate uniprocessor systems.

Referring now to FIGS. 3A through 3D, there are shown additional details of the apparatus within each of the MSSAs to achieve the checking and monitoring accomplished by this invention. Each MSSA in the system contains the apparatus shown in these figures.

In FIGS. 3A-3D, a sign preceding the name of a line is meant to indicate the active state of the line. In other words, if the condition being tested is present, the line will have the polarity shown. The logic blocks utilized in the figures are positive input AND inverts and minus input OR inverts. If all inputs to an AND are positive, its output will be negative. If any input to an OR is negative, its output will be positive.

It would serve little or no purpose to recite all of the logical interconnections utilized in this particular preferred embodiment of the invention. Rather, the meaning and function of the various lines shown in these figures will be described below. From this description, those skilled on the art will clearly see the logic functions, and recognize how they may be implemented in any given environmental system.

A SYSTEM: The MSSA receiving the "true" state of this line is on the A side of the multiprocessing system. In the B side MSSA, this signal will appear in its NOT (that is, minus) form.

CONTROL REGISTER BIT 6: The MSSA is available. That is, it has completed its IML and it is on a side that is fully initialized.

CONTROL REGISTER BIT 12: The service processor associated with this MSSA is the prime service processor. It is, or will become, the active service processor in the multiprocessing system.

COUPLE TO REMOTE SIDE: This signal is one of the few signals in the system that is directly dependent upon whether it is in the MSSA that is on the A side of the MSSA that is on the B side. In the preferred embodiment of this invention, this signal is used as a "tie-breaker" to insure that, when both the A side and the B side service processors become ready at essentially the same time, the A side service processor will become the prime (active) service processor. The signal is utilized in setting the switches 8A and 9B shown in FIG. 1.

DO WARM IML: This line is used to force a new IML if IML has been completed and either both service processors are indicated to be prime, or neither is indicated to be prime.

ENABLE SWITCH TO REMOTE SIDE: This output is utilized in setting the switches 8B and 9A shown in FIG. 1. It indicates that the service processor associated with the other MSSA will be the prime service processor and that, at the end of the IML sequence, the service processor associated with this MSSA will become dormant.

FORCE WARM IML: This line is primarily of significance in a uniprocessor system. It generates a signal to force a warm IML to the local service processor.

IML COMPLETE TO ROS: This line indicates that IML has reached a certain predetermined stage in its progression.

IML IN PROCESS: IML has not yet been completed in the service system associated with this MSSA.

IN IML TO REMOTE: This signal is transmitted from one MSSA to the other to indicate that the transmitting MSSA is still in the IML process. Functionally, it is a continuation of the IML IN PROGRESS line.

ISOLATE REMOTE ADAPTER: This is a signal which is used to set a control bit in the logic which is used to isolate the remote adapters during the IML sequence. This insures that the service systems will not interfere with each other during IML.

ISOLATE REMOTE ADAPTERS SWITCH: This is a physical switch which forces one side of the system not to communicate with the adapters on the other side. It, in effect, negates a multiprocessor environment.

LOCAL PRIME: The service processor associated with this MSSA is the active service processor in charge of the MP system.

LOCAL PRIMARY SWITCH: This is a physical switch which can be set to cause the service processor associated with this MSSA to be the prime service processor.

REMOTE MSSA AVAILABLE: This is a signal transmitted from the other MSSA indicated that its associated service processor has successfully completed IML and is initialized, (See also REMOTE MSSA PRIME.)

REMOTE MSSA IN IML: This is another signal received from the other MSSA. It indicates that the other MSSA is still in the IML process.

REMOTE MSSA PRIME: This is yet another MSSA-to-MSSA signal. It indicates that the service processor associated with the other MSSA will be the prime (active) service processor in the MP system.

REMOTE WAITING PRIME: This is still another MSSA-to-MSSA signal. It indicates that the other MSSA has proceeded to the final phase of IML. (See WAITING PRIME CONTROL.)

RESET PRIME CONTROL TRIGGER: This is simply a reset line that is activated when IML is begun. It serves as assurance that certain critical indicator bits (for example, control register bit 12) are appropriately initialized.

SET LOCAL CONTROL: This line causes control register bit 12 to be set indicating that the service processor associated with this MSSA will be the prime service processor.

SET PRIMARY MSC CONTROL: This line is the decode of a service processor command and causes the entry of the waiting prime state or, during the waiting prime state, sets one of the service processors as prime.

SET PRIME CONTROL TO CONTROL BIT 11: This signal turns off the isolate remote adapters trigger after IML has proceeded to an appropriate point. (See ISOLATE REMOTE ADAPTER).

STALL IML: This line will become active when the MSSA detects an apparent stall in its associated service processor. Checking for this condition is done only during the time that the associated service processor is the active service processor or when it is going through IML. The signal on this line indicates a new IML is necessary.

WAITING PRIME CONTROL: IML has proceeded to its final phase, the wait loop. Functionally, the extension of this line to the other MSSA is the REMOTE WAITING PRIME line.

WAITING PRIME CONTROL TO REMOTE MSSA: This signal is sent from this MSSA to the other MSSA to signal that this MSSA is in the wait loop at the end of IML.

WAITING PRIME SET CONTROL 12: This is a gate line which indicates that the end of the last phase of IML is complete. It is at this point that control register bit 12 is actually set (see SET LOCAL CONTROL) to indicate that the service processor associated with this MSSA will be prime.

WARM IML TO REMOVE MSSA: If the local side is prime and a stall has been detected, this line will force the other service processor to go through a warm start and take over the system.

In the preferred embodiment of this invention, IML is divided into three phases. The first phase utilizes a read only control store (ROS) in the MSSA which accomplishes a bootstrap load of control programs into its associated service processor. The next phase of IML includes essentially a complete initialization of the service system. The third and last phase of IML is a wait loop of sufficient duration to practically guarantee that the service systems on both sides will complete the first two phases of IML before either has completed this last phase. In the preferred embodiment of this invention as illustrated and described above, the apparatus makes it almost certain that the A side of service processor wil become the prime service processor for the system. Of course, if a problem (for example, a stall) were to develop with the A side system during IML, the B side system, if it did not encounter any similar problem, would initially become the active system. For additional information concerning IML, reference may be made to the manuals incorporated by reference above.

Of course, those skilled in the art will recognize that the three-phase IML process referred to herein need not be utilized in any particular implementation of the invention. For example, the wait loop could be done away with, in which case the first service system to complete its initialization would obtain control of the system.

As a still further modification, any desired algorithm could be utilized for determining which service processor first assumes control of the MP system. For example: one side could be unconditionally designated as the initial controlling side; the system could utilize a different side as the initial controlling side on each successive SYSTEM INITIALIZATION (this, of course, would require that a record of prior initializations survive across subsequent initializations); or the user could be required to designate the initialing controlling side.

In another modification, more than two central processors and/or more than two service processors could be utilized in the MP system. The techniques described above would still be applicable in such a case.

As yet another modification, an arror in the active service processor could be used to produce a signal to restart the entire IML, allowing the previous active service processor to again become the active one. This would not be as reliable as the preferred technique by which, after an error, the other service processor always becomes the active one.

While the invention has been described with respect to a preferred embodiment thereof, those skilled in the art will recognize that the above and other changes may be made therein without departing from the spirit and scope of the invention.

Having thus described our invention, what we claim as new, and desire to secure by Letters Patent is:

1. In a multiprocessing system with two service processors each of which is capable of monitoring and controlling a different one of two active processors of the multiprocessing system, an improved means for allowing monitoring and controlling the multiprocessing system comprising:

cross coupling means joining each of the two service processors to each of the two processors in the multiprocessing system indepdendently of the other service processor to allow monitoring the controlling the multiprocessor system and the two processors directly by either of the service processors;

selection means in said cross coupling means for selecting one service processor out of the two service processors and insuring that only said one service processor operates in an active status where it assumes control of the multiprocessing system and both of the two processors, and that the other service processor of said two service processors is not in control of the multiprocessing system or either of the two processors but is in a backup status where it is available to assume said active status in case of malfunction of said one service. processor; and reconfiguration means in said cross coupling means responsive to detection of one or more of a set of conditions of the service processor in active status to cause the two service processors to exchange their active and backup status with respect to the multiprocessing system and the two processors.

2. The multiprocessing system of claim 1 wherein:
said reconfiguration means includes means responsive to the presence of one or more of said set of conditions to cause a reinitialization of the service processor which had been in backup status.

3. The multiprocessor system of claim 2 wherein, upon detection of any of said set of conditions, both of said service processors are reinitialized.

4. The multiprocessing system of claim 1 wherein said selection means includes means for operating each of the processors in the multiprocessing system as separate uniprocessors responsive to their respective service processors until both of the two service processors are initialized.

5. The multiprocessor system of claim 1 wherein said selection means is responsive to a manual switch to make the selection of the service processor that controls the multiprocessing system.

6. The multiprocessor system of claim 4 wherein said selection means includes:
means responsive to said service processors for selecting as said one service processor the first of said service processors to reach a certain predetermined stage in its initialization.

7. The multiprocessor system of claim 6 wherein the selection means includes:
tiebreaking means responsive to said service processors for selecting one of said service processors in the event that both service processors reach the predetermined stage in their initialization substantially simultaneously .

8. The multiprocessor system of claim 6 further including:
means responsive to the detection of one of said set of conditions of said one service processor for reinitializing both service processors; and
means for causing the two service processors to exchange their active backup status after reinitialization.

* * * * *